April 7, 1970  A. J. HILLER  3,504,552
PARTICLE CONTACT COUNTER AND METHOD
Filed Nov. 22, 1967  3 Sheets-Sheet 1

INVENTOR
ALEXANDER J. HILLER

BY
ATTORNEY

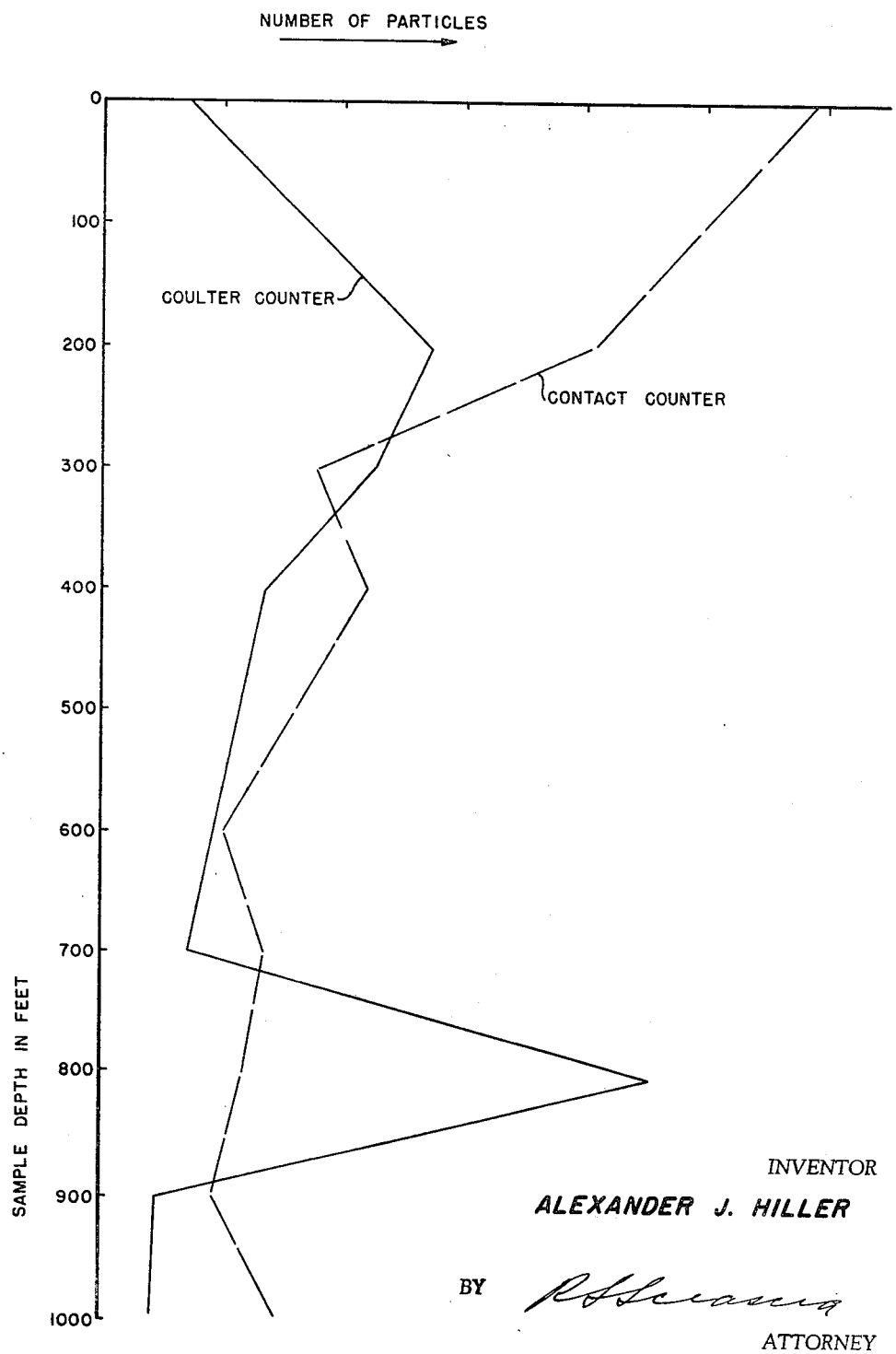

United States Patent Office 3,504,552
Patented Apr. 7, 1970

3,504,552
PARTICLE CONTACT COUNTER AND METHOD
Alexander J. Hiller, Bowie, Md., assignor to the United States of America as represented by the Secretary of the Navy
Filed Nov. 22, 1967, Ser. No. 685,008
Int. Cl. G01b 5/28
U.S. Cl. 73—432　　　　　　　　　　　　　　　　8 Claims

ABSTRACT OF THE DISCLOSURE

The number of particles present in a given volume of fluid is determined by placing the particles on a smooth surface and uniformily scanning the surface with a stylus which generates an electrical signal on contacting the particles. The signal is representative of the movement of the stylus caused by contact with the particles and therefore is representative of the number of particles contacted and the size of the particles.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the invention

This invention relates to a method of determining the number or size, or both number and size of particulate matter dispersed in a fluid medium. The invention particularly relates to a new use of devices heretofore used to measure the surface roughness of materials such as metal or paper. More specifically, the invention relates to a method and apparatus for counting individual particles fixed to a smooth surface by contacting these particles with a mechanism which generates an electrical signal representative of the number of particles fixed to the surface.

Description of the prior art

Contact instruments for measuring the surface roughness of materials are well known. These devices are moved across the surface being inspected and a stylus is used to measure surface contour, or roughness of the surfaces of metal, glass, plastic, paper, plated, and painted surfaces. A wide variety of such roughness indicators are manufactured by the Brush Electronics Company, Division of Cleavite Corporation, Cleveland, Ohio.

Roughness instruments have not been applied to the field of counting particles contained in fluids. Prior art particle counting methods employ membrane filters for collecting the particulates with the membranes being analyzed by reflectance spectrophotometer or manually using microscopy. Other methods include capacitance measurements of voids in cloth or inclusions therein, sedimentation methods using Stokes Law, and countless other techniques, the most well known of these using the Coulter counter. Many of the prior art methods have been unable to accurately detect particles in the submicron range, below one micron, such as submricon particles in sea water. Electron microscopy has been employed but individual counting of each particle is tedious and the equipment is extremely expensive.

Most of the above techinques employ extremely delicate equipment requiring skilled labor working in a controlled environment. Few of the methods provide a permanent record of the particle display and none permanently preserve the actually collected particles.

SUMMARY

The instant process and apparatus allows direct counting of fluid particles in the submicron range without the need for expensive equipment or tedious visual techniques.

The process for measuring particles in fluids utilizes the principle of surface roughness. When the particulates in a given volume of sea water are uniformly distributed on a smooth surface, the surface having deviations from a plane much less than the diameter of the particles placed on the surface, particles are counted and sized by a contact sensor which scans the surface in a manner similar to the way a phonograph needle scans a record.

Contact of a particle on the smoth surface causes a deflection of the needle (stylus or member) which is utilized to modify a magnetic field or to deform a crystal so that an electrical signal is produced which is representative of the deflection of the contacting member or stylus.

An object of the present invention is to provide a method and apparatus utilizing the shock of contact between a member and particle to generate an electrical signal representative of the shock wave from which the number and size of particles dispersed in a fluid medium are determined.

Another object is to provide a permanent record of particle distribution in fluids;

A further object of the invention is to measure particles below one micron in diameter.

BRIEF DESCRIPTION OF THE DRAWINGS

Other objects and many of the attendant advantages of this invention will be readily appreciated as the same becomes better understood by reference to the following detailed description when considered in connection with the accompanying drawings and wherein:

FIG. 4 presents data from an actual shipboard comparison of the Coulter counter and the contact measuring device of this invention.

DESCRIPTION OF THE PREFERRED EMBODIMENTS

Figure 1:
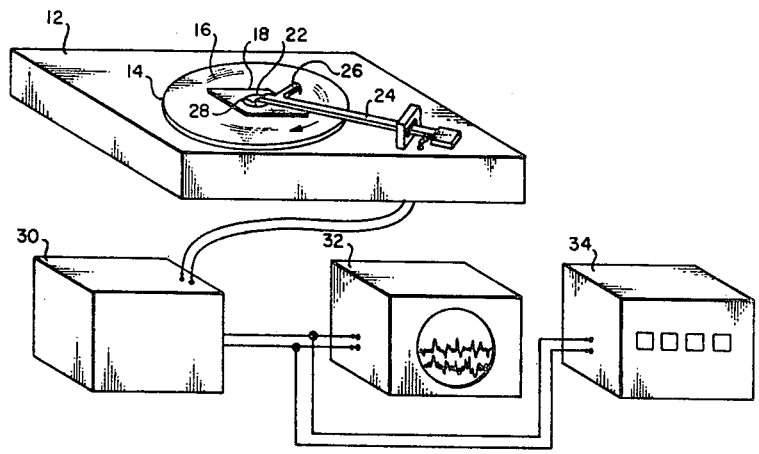
FIG. 1 is a perspective view of one embodiment of the counting device of this invention employed to practice the method of this invention.

Referring now in detail, there is shown by FIG. 1, one embodiment of the test equipment of this invention used in practising the method of this invention. There is shown in a conventional stereo record player 12 having a turntable 14. A record 16 is shown supported by turntable 14 in the conventional manner. The record player pivotal arm 24 contains the conventional stereo pickup stylus 28 but is modified by member 26 which is attached to the arm 24 and designed to track the grooves of record 16. A smooth surface substrate 18, supported by turntable 14, is shown fixed to record 16 by any convenient method which prevents slippage during operation of the turntable. Area 22 sets forth the portion of the smooth substrate 18 to which particulate matter is fixed by methods to be more particularly described hereinafter.

The substrate 18 may be of any smooth material with surface irregularities appreciably less than the particle diameters to be measured. Suitable materials are for example glass, hard plastic, finely finished metals, etc. The substrate is preferably coated with material to fix the individual particles to the substrate. Suitable materials include gelatin, animal glue, collodion, and any other substance which provides a plastic surface which later hardens to fix the particle to the substrate. The preferred substrates and coatings are gelatin coated glass substrates, for example, conventional "Kodak" lantern slides or photographic film such as 8 millimeter film. The surface of the lantern slide and film when moistened softens sufficiently to affix the particles to the substrate on hardening. Also useful as a substrate is magnetic film of the type used in tape recorders.

The method of determining the quantity of particulate matter may be practiced using the equipment shown in FIG. 1 by collecting a sample of particulate matter on a suitable filter, for example "Millipore" tape, which is not shown. Particulate matter is transferred from the filter to substrate by placing the moist material face down on the coated substrate, in this case a lantern slide. The particulate matter contained on the filter is transferred to the smooth substrate surface and on drying is firmly fixed thereto. This provides a test sample for particle determination and for any other purposes required of it since the lantern slide is easily stored and resistant to abuse. In addition the plate or film may be developed and the resulting photograph kept for record purposes.

There are alternate methods of preparing substrates. For example, "records" have been prepared by mixing plant pollens of known size in a medium of collodion, acetone and amyl acetate which is aerosol sprayed on a glass plate (substrate). Pollens are dispersed uniformly on the plate and held in position by the thin coating of collodion after the solvents evaporated. The stereo pickup unit is scanned over the particles fixed on the glass plate and pulse heights proportional to pollen size observed on an oscilloscope while the particle count is recorded by the electronic counter and is confirmed by a visual count.

Another technique for fixing particles to the substrate is to merely introduce a tacky coated substrate into the volume of fluid to be investigated, for example, into a volume of air where pollen count is to be determined.

After the particulate matter is fixed to the substrate the substrate is fixed to a record 16 which in turn is placed on the turntable 14. The pivotal arm 24 is positioned by placing guide member 26 in the groove of record 16 so that the stereo cartridge 28 is beyond the outer boundary of the sample 22. The record player is turned on and the arm 24 allowed to track the record causing the stereo cartridge 28 to scan the particulate area of the sample in a controlled, predetermined path. Any portion of the total sample area desired is traversed by the stereo cartridge 28 and a determination of area is made which enables the number of particles present on a given area to be calculated. The number of particles per given area is then used to calculate the number of particles present in the original fluid.

On scanning the particulate area 22 the stereo needle or member (not shown) contacts each individual particle. This contact causes movement of the member which produces through the use of a deformable crystal or a magnetic field (in the cartridge 28) an electrical signal representative of the movement experienced by the member. Stereo needles are particularly useful for they record movement both in a horizontal and vertical direction and give a positive indication of particles whether the member contact is orthogonal or tangential to the surface of the particle (monoral needles track only laterally). The electrical signal generated is amplified in unit 30 with suitable precautions taken to eliminate turntable rumble. The signal is then passed to an oscilloscope shown at 32 and/or an electronic counter, shown as 34, where the wave form of the electrical signal may be used to determine the number of particles contacted.

When it is desired to know the size of each particle the stereo cartridge 28 is fixed a known distance above the substrate 18 by suitable device such as a micrometer attached to member 26. The sample area 22 is then scanned at progressively lower cartridge heights and a recording is maintained for the number particles contacted at each fixed height from the substrate surface. This data is then used to construct a particle size distribution since both the particle size diameter is known and the number of particles has been determined.

Figure 2B:
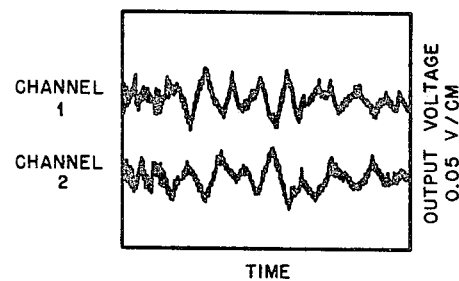
FIG. 2b illustrates the same oscilloscope signal when scanning the substrate having particles fixed thereto.
Figure 2A:
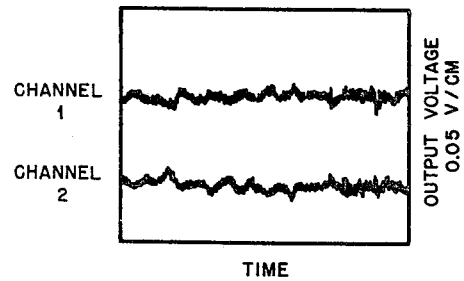
FIG. 2a illustrates the type of oscilloscope signal generated by scanning a smooth substrate without particles using a stylus capable of movement in more than one direction following the method of this invention.

FIG. 2a illustrates the type of signal generated when a smooth substrate, without particles is scanned using a stereo cartridge (or stylus capable of movement in more than one direction) and which is displayed by an oscilloscope 32. Obviously the smoother the substrate the more sensitive the device.

FIG. 2b shows the oscilloscope display that results from scanning a substrate having placed thereon particulate matter as heretofore described. It is readily apparent from a comparison of FIGS. 2a and 2b that the amplitude of waves in FIG. 2b is representative of the particles contacted by the stylus 28.

The particle size distribution may also be determined by using a stylus or member (28) which follows the vertical contour of the particles. The stylus in this case becomes the transducer in a closed servo loop. Upon contacting the particle, the stylus deforms and produces a signal which is amplified and used to control the height of the stylus above the substrate so that the stylus signal is returned to zero. With appropriate response time of the feedback loop the stylus then "rides" over the particles and the voltage produced in the servo loop is proportional to particle height. This time varying voltage may be processed by threshold circuitry to yield a particle size distribution in a manner similar to that obtained by successive lowerings of the stylus to the substrate. An advantage of this method is that it is non-destructive to the particles whereas the former method may tend to remove some of the particles upon impact.

Figure 3:
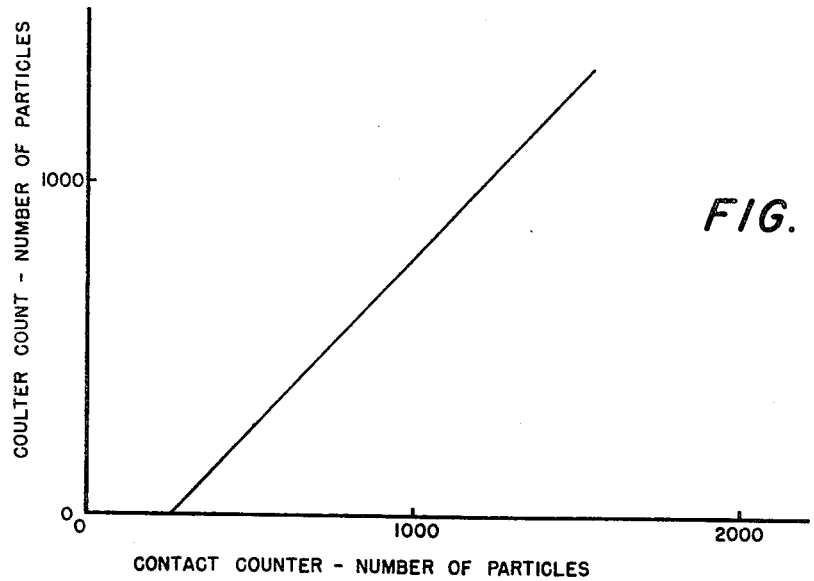
FIG. 3 is a correlation between the results obtained by practicing the present method for counting particles (contact counter) and using the conventional Coulter counter.

Referring now to FIG. 3, there is shown a correlation between the results using the conventional Coulter particle counter and the contact counter of this invention. A four hundred and fifty milliliter sample of sea water was passed through a 0.45 micron membrane filter. The particulate matter collected by the filter was then transferred to a gelatin coated glass plate, in this case a three by five inch "Kodak" glass lantern slide by placing the filter in contact with the plate. The gelatin has a unique property of soaking up the dissolved salts in the water which would normally interfere with particle count while insoluble particles are left protruding from and attached to the plate because of the adhesive property of the gelatin.

The device employed for measuring the particles consisted of equipment similar to that described in FIG. 1. Pulse heights proportional to particle size were observed on the oscilloscope and an electronic particle count checked with a visual count.

An equivalent sample of sea water was passed through a Coulter counter. FIG. 3 shows the linear relationship between the number of particles counted by the Coulter counter and the number of particles counted by the contact counter of this invention. The correlation is off-set slightly from the zero point on the graph due to turntable rumble and substrate surface variations which may be compensated for if desired.

A stereo pickup is used so that contact of particles by a stylus either head on or glancing from one side is recorded. If the stylus is part of a cartridge which records only vertical or only horizontal movement the contacts with particles that caused movement in a direction perpendicular to the recording direction are not counted.

FIG. 4 presents data of an actual shipboard analysis of sea water by a conventional Coulter counter and by the contact counting method of this invention. The ordinate is marked to show the depth at which the water sample was obtained in feet. The abscissa is marked to show the relative particle count. It was found by visual inspection, that the samples taken at eight hundred feet and at sea level contained a quantity of particles closer to that indicated by the contact counting method of this invention than that indicated by the Coulter counter. This is due to the fact that it is difficult on a pitching ship to employ a delicate instrument, such as the Coulter counter, that depends on a manometer to meter the sea water through the instrument. The turntable was found to perform satisfactory and was capable of withstanding the pitching and rolling of the ship on the high seas without influencing the particle count values.

The simplicity of the equipment employed for this invention is particularly useful in counting submicron particles which normally require expensive equipment operated by highly skilled people. In addition, the invention may be practiced in any environment including a pitching ship and provides a permanent photographic record of particle distribution if desired.

Obviously many modifications and variations of the present invention are possible in the light of the above teachings. It is therefore to be understood the invention may be practiced otherwise than as specifically described.

What is claimed and desired to be secured by Letters Patent of the United States is:

1. Method for detecting the quantity of particles in a predetermined volume comprising the steps of:
   causing said particles to be disposed on a smooth surface;
   engaging said particles with a member so as to cause said member to move correlative to said particles;
   generating an electrical signal representative of the movement of said member caused by said particles;
   scanning the surface a plurality of times with said member; and
   adjusting said member each time to progressively closer distances to said smooth surface to thereby determine the size of each particle contacted.

2. The method of claim 1 further including the step of: adhering said particles to said smooth surface.

3. A test apparatus for detecting a quantity of particles in a predetermined volume comprising:
   a smooth surface for supporting the particles under test and having a surface variation substantially less than the particle diameter,
   means for engaging the particles supported by said smooth surface, said engaging means including an arm pivotal about a point source and having a stylus at the free end of the pivotal arm whereby particles supported by the smooth surface are contacted by said stylus,
   a rotatable turntable means for producing relative movement between said smooth surface and said particle engaging means whereby said engaging means contacts the particles under test;
   circuit means operatively associated with said engaging means for producing electrical signals correlative to the moving engagement of said engaging means with the particles under test; and
   means responsive to said electrical signals for indicating the number of particles contacted.

4. The apparatus of claim 3 in which a light sensitive coating adheres said particles to said smooth surface.

5. The apparatus of claim 4 in which the smooth surface is photographic film.

6. The apparatus of claim 4 in which the particles are blood particles.

7. The apparatus of claim 4 in which the particles are sea water particles.

8. The test apparatus of claim 3 in which said stylus engaging means is capable of movement in more than one direction.

References Cited

UNITED STATES PATENTS 3,123,999  3/1964  Judd _____ 73—105
3,225,296  12/1965  Roth _____ 324—61

CHARLES A. RUEHL, Primary Examiner

E. J. KOCH, Assistant Examiner

U.S. Cl. X.R.

73—105